United States Patent [19]
Mitsutake et al.

[11] Patent Number: 5,208,620
[45] Date of Patent: May 4, 1993

[54] DISPLAY APPARATUS

[75] Inventors: Hideaki Mitsutake; Nobuo Minoura, both of Yokohama; Katsumi Kurematsu, Kawasaki; Haruyuki Yanagi, Yokohama, all of Japan

[73] Assignee: Canon Kabushiki Kaisha, Tokyo, Japan

[21] Appl. No.: 718,908

[22] Filed: Jun. 24, 1991

Related U.S. Application Data

[63] Continuation of Ser. No. 416,424, Oct. 3, 1989, abandoned.

[30] Foreign Application Priority Data

Oct. 4, 1988 [JP] Japan .................. 63-250375
Sep. 25, 1989 [JP] Japan .................. 1-248715

[51] Int. Cl.$^5$ ............................. G03B 21/22
[52] U.S. Cl. ........................... 353/74; 353/38; 359/448; 359/457
[58] Field of Search ................... 353/74–79, 353/38; 350/117, 122, 123, 125, 127, 128, 452; 359/448, 449, 456, 457, 460

[56] References Cited

U.S. PATENT DOCUMENTS

| | | | |
|---|---|---|---|
| 2,441,747 | 5/1948 | Beshgetoor | 76/107 |
| 2,510,344 | 6/1950 | Law | 88/2.93 |
| 3,848,980 | 11/1974 | Plummer | 350/128 |
| 3,972,593 | 8/1976 | Appledorn et al. | 350/211 |
| 3,982,822 | 9/1976 | Conder et al. | 353/38 |
| 4,076,384 | 2/1978 | Deml et al. | 350/122 |
| 4,147,408 | 4/1979 | Plummer | 350/128 |
| 4,152,047 | 5/1979 | Inoue | 350/122 |
| 4,173,399 | 11/1979 | Yevick | 353/78 |
| 4,374,609 | 2/1983 | Lange | 350/128 |
| 4,391,495 | 7/1983 | Mazurkewitz | 350/452 |
| 4,439,027 | 3/1984 | Shioda et al. | 353/77 |
| 4,458,993 | 7/1984 | Kempf | 353/78 |
| 4,468,092 | 8/1984 | Inoue et al. | 350/128 |
| 4,482,206 | 11/1984 | Van Breeman | 350/128 |
| 4,509,822 | 4/1985 | Clausen et al. | 350/128 |
| 4,512,631 | 4/1985 | Van Breeman | 350/128 |
| 4,525,029 | 6/1985 | Inoue et al. | 350/128 |
| 4,550,977 | 11/1985 | Inoue et al. | 350/128 |
| 4,666,248 | 5/1987 | van de Ven | 350/128 |
| 4,674,836 | 6/1987 | Yata et al. | 350/129 |
| 4,701,020 | 8/1987 | Bradley, Jr. | 350/128 |
| 4,708,435 | 11/1987 | Yata et al. | 350/128 |
| 4,721,361 | 1/1988 | van de Ven | 350/128 |
| 4,725,134 | 2/1988 | Ogino | 353/74 |
| 4,741,613 | 5/1988 | Vanderwerf | 353/38 |
| 4,756,603 | 6/1988 | Ohtani | 350/127 |
| 4,919,518 | 4/1990 | Ogino et al. | 350/128 |
| 4,963,016 | 10/1990 | Heijnemans et al. | 353/74 |

FOREIGN PATENT DOCUMENTS

| | | | |
|---|---|---|---|
| 1487841 | 5/1967 | France . | |
| 60-61738 | 4/1985 | Japan . | |
| 0130543 | 5/1990 | Japan | 359/457 |
| 692569 | 6/1953 | United Kingdom . | |

Primary Examiner—William A. Cuchlinski, Jr.
Assistant Examiner—Alvin Wirthlin
Attorney, Agent, or Firm—Fitzpatrick, Cella, Harper & Scinto

[57] ABSTRACT

A display apparatus comprises a projecting device for projecting an image, with the projecting device having a projection optical system having a limited pupil diameter and screen device arranged at a position where an image is substantially projected by the projecting device. The screen device has at least two sheets in each of which a number of prisms extending like a straight line or a curve are formed on the surface on the side opposite to the projecting device. Each of the prisms has an effective portion for allowing a light flux from the projecting device to be emitted in a predetermined direction and a non-effective portion which does not contribute to the emission of the light flux in the predetermined direction, and wherein the non-effective portions of another one or a plurality of the other sheets among the plurality of sheets excluding the sheet arranged at the nearest position on the projecting device side are formed so as to have an almost intermediate angle between the angle of a principal ray when a light flux from the projecting device progresses in the sheets and the emission angle of the principal ray when it is emitted from effective surfaces of the prisms of the sheets.

14 Claims, 14 Drawing Sheets

FIG.1B
PRIOR ART
FIG.1C
PRIOR ART
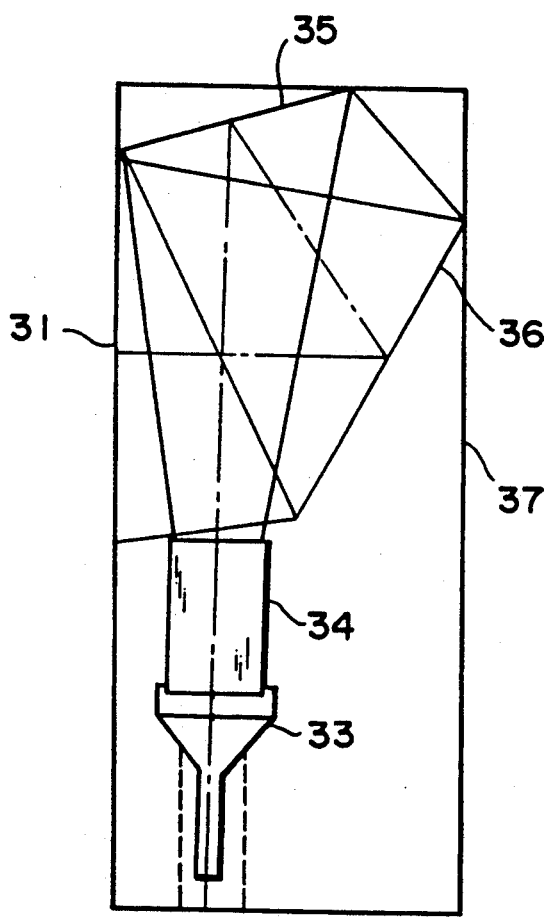
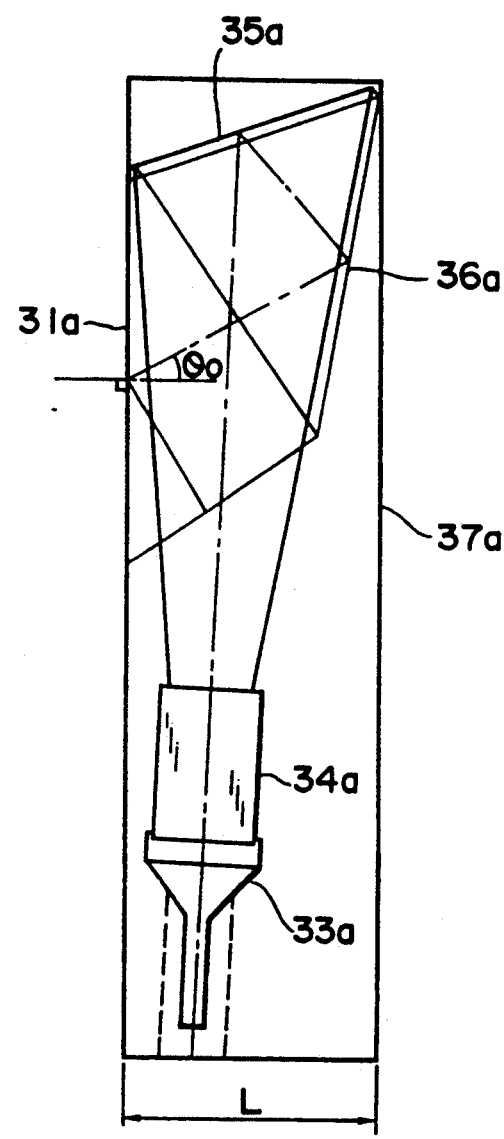

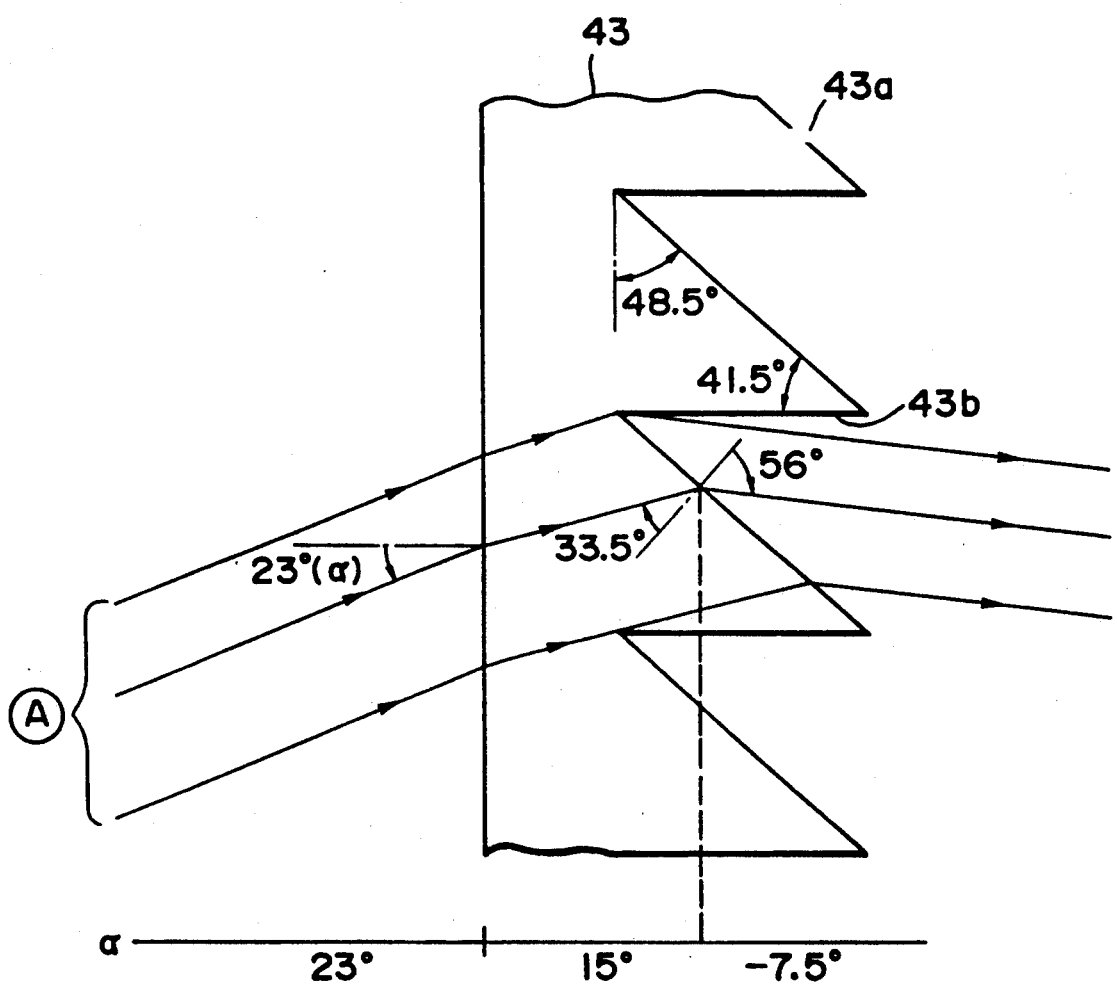

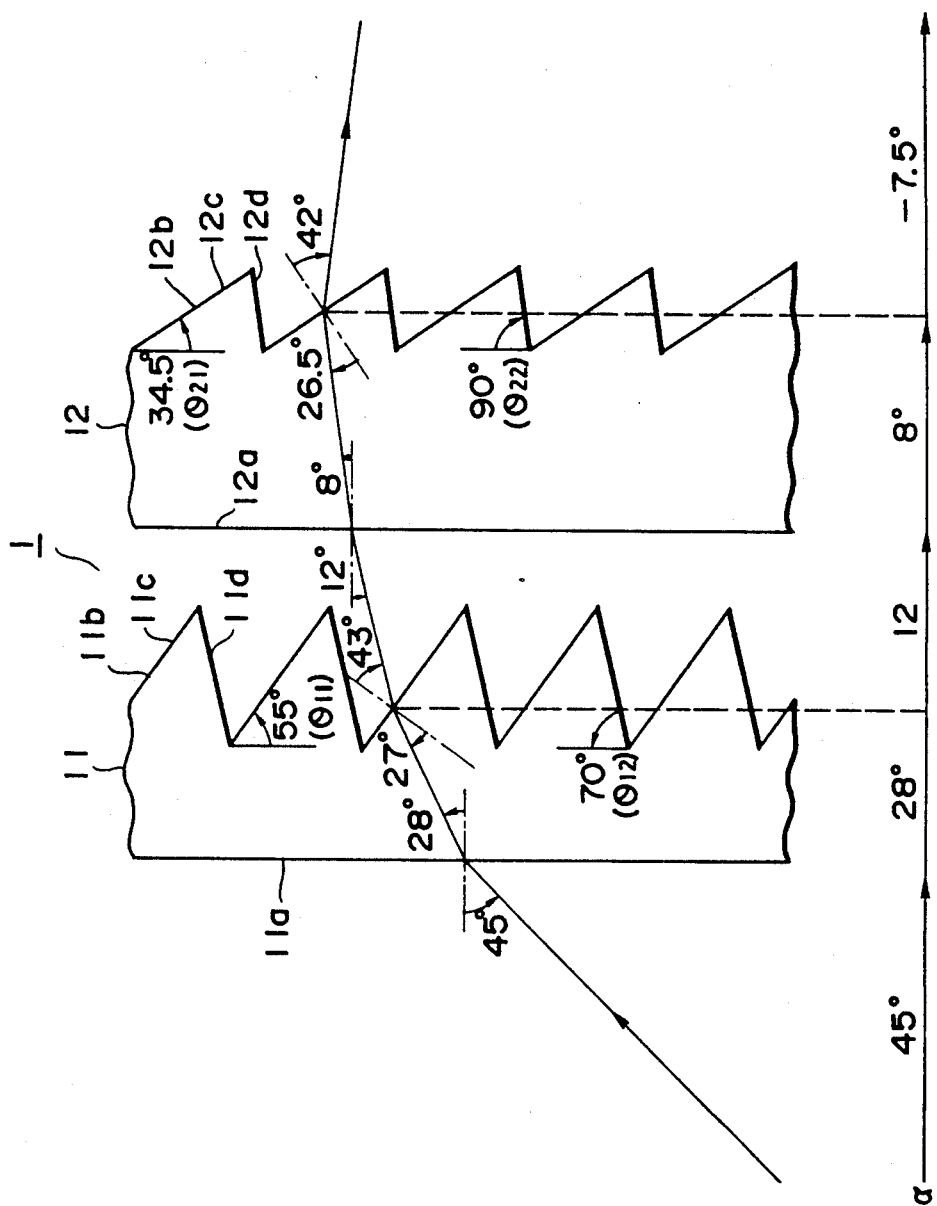

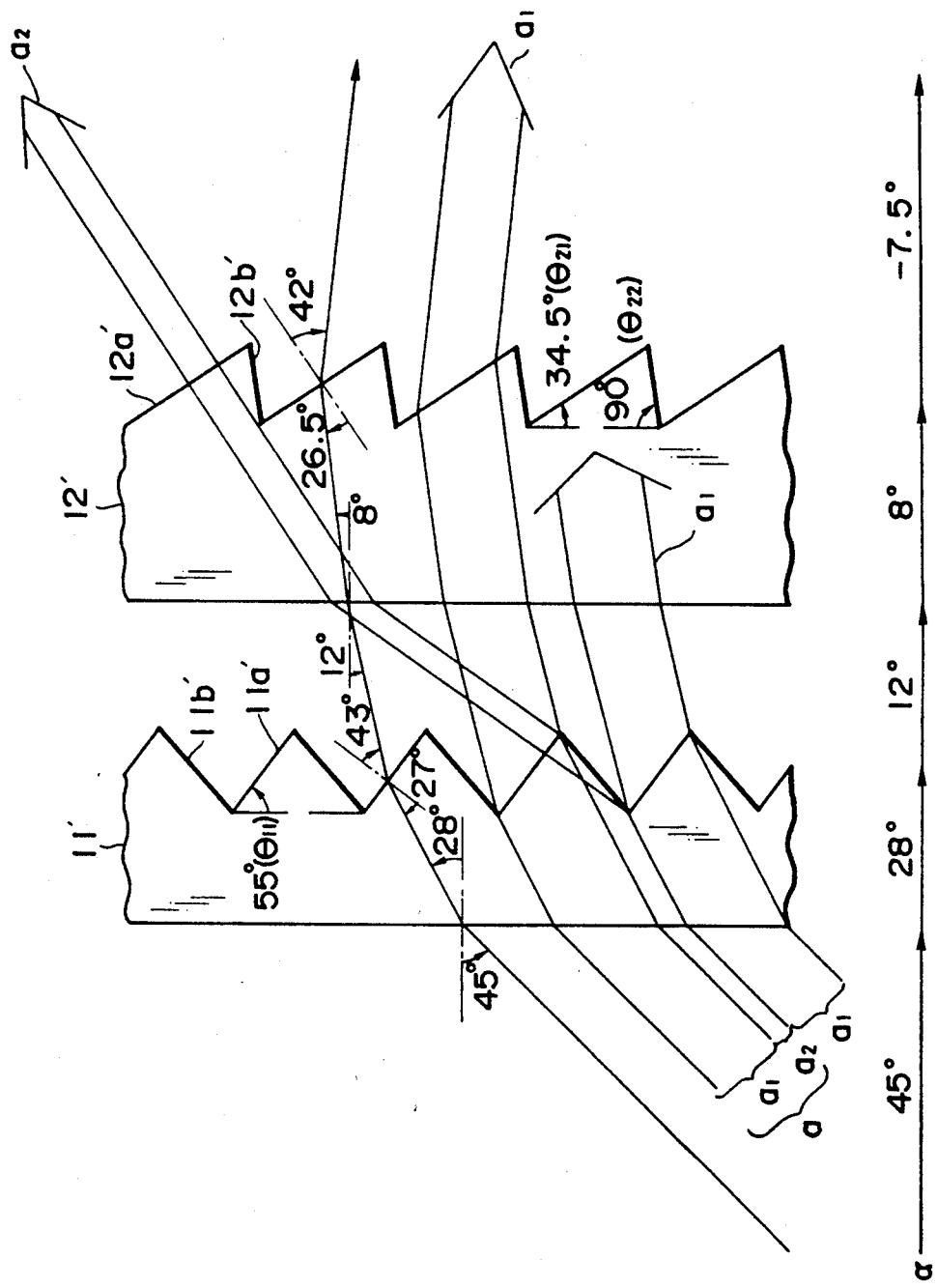

DISPLAY APPARATUS

This application is a continuation of application Ser. No. 07/416,424 filed Oct. 3, 1989, now abandoned.

BACKGROUND OF THE INVENTION

1. Field of the Invention

The present invention relates to a display apparatus and, more particularly, to a display apparatus which is suitable as a projecting apparatus such as a video projector or the like in which an image which was projected and formed at an angle by projecting means is observed from a space on the side opposite to the projecting means.

2. Related Background Art

Hitherto, in the projecting apparatus such as a video projector or the like, there has widely been used what is called a back projecting type screen in which an image from projecting means is formed onto a screen and the projection image is observed from a space on the side opposite to the projecting side, that is, the back side.

FIG. 1A schematically shows an example of a projecting system using a conventional back projecting type screen.

In the diagram, reference numeral 31 denotes a transmitting type screen having a Fresnel lens, 33 indicates a CRT, and 34 a projecting lens. The screen 31 has a size of a diagonal length of, for instance, 50 inches (1100 mm×600 mm). A projection image by the projection lens 34 is formed onto the screen 31. FIG. 1B shows an example of a back projecting type display apparatus in which such a projecting system is enclosed in a cabinet. Reference numeral 35 and 36 denote mirrors and 37 indicates a cabinet.

In FIG. 1A, the center of the pupil of the projecting lens 34 exists at a position 130 mm away from from the CRT 33 and 1500 mm away from the screen 31. An incident angle of a light flux which enters the outermost peripheral portion on the diagonal line of the screen 31 from the center of the pupil of the projecting lens 34 to the screen 31 is set to about 23°. The light flux transmitted through the screen 31 is focused to a position corresponding to the distance which is about eight times larger than the height (600 mm) of the screen 31 by the Fresnel lens on the screen 31.

As examples of the screens 31 shown in FIGS. 1A and 1B, there have been known screens as shown in FIGS. 2A and 2B each of which illustrates a cross sectional view of the central portion of the screen. A screen 41 of FIG. 2A is constructed such that the light flux incident side is set to a Fresnel lens surface 41a and the emitting side is set to a lenticular lens surface 41b. FIG. 3A shows a light path of the light flux which enters the outermost peripheral portion of the screen 41 at an angle of 23° to an optical axis (indicated by a chain line in FIG. 1A) of the projecting lens 34. In this case, a refractive index of the material of the screen 41 is set to 1.5 and the emitting side of the screen 41 is shown as a plane surface. In the lower portion of FIG. 3A, progressive angles α (angles to the optical axis, that is, the horizontal direction of the projecting lens 34) of the light flux before and after the transmission of each surface are shown.

Assuming that a cross sectional shape of prisms which extend like an arc and form the peripheral portion of the Fresnel lens surface 41a is as shown in FIG. 3A, an incident angle of the prism to a Fresnel lens effective surface 41c is set to 65° and a transmission factor at this time is set to 88%. An incident angle to the emitting surface is set to −5° (an angle in the case of the clockwise direction when it is measured from the optical axis is set to a minus value). A transmission factor at the emitting surface at this time is set to 96%.

Further, the light flux which enters a non-effective surface 41d of the Fresnel lens surface 41a is lost. A loss ratio Q of the lost light to an incident light amount is expressed as follows.

$$Q = \tan \alpha \cdot \tan \theta$$

In the example of FIG. 3A, Q is set to about 38%.

Thus, in the case of the projecting system of the vertical incident type using the screen 41 shown in FIG. 2A, a transmission factor $T_1$ in the outermost peripheral portion of the screen 41 is set to $$\begin{aligned} T_1 &= 0.88 \times (1 - 0.38) \times 0.96 \times 100 \\ &= 52\ (\%) \end{aligned}$$

Therefore, the light amount is reduced by about 43% as compared with the transmission factor of 92% in the central portion of the screen.

On the other hand, a screen 42 shown in FIG. 2B is constructed to prevent the reduction in light amount in the peripheral portion. In FIG. 2B, reference numeral 43 denotes a translucent sheet in which the incident side, namely, the back side is set to a plane surface and the emitting side, that is, the observing side is set to a Fresnel lens surface 43a, and 44 indicates a translucent sheet in which the incident side is set to a plane surface and the emitting side is set to a lenticular lens surface 44a.

FIG. 3B shows a light path of the light flux which enters the outermost peripheral portion of the sheet 43 under the conditions similar to those in FIG. 3A. Assuming that prisms which form the peripheral portion of the Fresnel lens surface 43a have a cross sectional shape as shown in the diagram, the light flux shown by Ⓐ is not lost at a non-effective surface 43b but transmits the Fresnel lens surface 43a. Therefore, in this case, the light flux is lost by only the amount of light reflected by the surface. Thus, a transmission factor in the outermost peripheral portion is about 90% and is almost equal to that in the central portion of the screen 42.

The above description relates to the projecting system of the vertical incident type in which the optical axis of the projecting lens 34 vertically crosses at the center of the screen surface. On the other hand, in order to miniaturize the whole system (particularly, to reduce the depth), as shown by broken lines in FIG. 1A, it is demanded to realize a projecting system of the type in which an image from a CRT 33a is projected onto a screen 31a at an angle through a projection lens 34a, that is, of the oblique incident type in which the optical axis of the projection lens obliquely crosses the screen surface.

A back projecting type display apparatus of such a type is constructed as shown in FIG. 1C. In the diagram, reference numerals 35a and 36a denote mirrors and 37a indicates a cabinet. An image displayed on the screen of the CRT 33a is obliquely projected onto the screen 31a from the right upper direction. In FIG. 1C, although the image projecting direction is different from that of the system shown by broken lines in FIG. 1A, both of them are optically substantially equal.

With the above construction, a depth L of the cabinet 37a can be reduced as compared with that in the case of the vertical incident type.

However, in the case of the construction of FIG. 1C, the projection image light which is emitted from the screen 31a to the left observing side is emitted on the side which is lower than the horizontal direction by only an angle $\theta_0$. Thus, the image becomes dark for an observer who observes from the front side of the screen 31a. Therefore, in order to emit the projection image light from the screen 31a in the horizontal direction, it is necessary to construct a screen having an eccentric Fresnel lens as shown in FIG. 1D.

However, in the oblique incident type, there is a case where an incident angle of the light flux which enters the outermost peripheral portion (particularly, the lower peripheral portion in FIG. 1C) of the screen 31a is set to 45°. In this case, even if the screen 42 shown in FIG. 2B which can preferably function in the vertical incident type is used, an incident angle of the light flux to the second surface (that is, the Fresnel lens surface 43a in FIG. 3B) of the screen 42 in the outermost peripheral portion (in particular, the lower portion) reaches an angle near the total reflection angle or exceeds the total reflection angle, so that a peripheral light amount suddenly decreases. Particularly, in a construction in which three CRTs of red, green, and blue are arranged as a projector for a color image, incident angles to the screen differ every color and a color shift is caused. The color shift is further amplified due to a sudden increase in reflectance at the foregoing surface.

As means for solving the above problem, there is considered a method whereby as shown in, for instance, FIG. 1E, the power is distributed by using two Fresnel lens surfaces on each of which a number of prisms are formed, thereby preventing a peripheral light amount from being suddenly reduced even if an incident angle of the light flux to the peripheral portion of the screen increases. However, according to such a construction, there is a fear such that a moire or a multiple image occurs due to a repetitive periodic structure of a plurality of prism groups and the observation of the projection image is obstructed.

When solving the above problems, it is necessary to also consider the following points. The projection lens 34 (34a) of the projector shown in FIG. 1A has a limited pupil diameter. Therefore, an incident angle of the light flux which enters a certain point on the screen has a limited extent around the principal ray as a center. On the other hand, in the construction in which three projection lenses for red, green, and blue are arranged, since each lens has a limited pupil diameter, a range of the incident angle is further extended.

SUMMARY OF THE INVENTION

It is the first object of the invention to provide a display apparatus in which although a plurality of Fresnel lens surfaces on each of which a number of prisms are formed are used, an image of a high resolution can be obtained without causing a moire, a multiple image, or the like.

In addition to the above construction, it is the second object of the invention to provide a display apparatus in which a projection image light can be emitted in the horizontal direction although the oblique incident type is used.

The above and other objects and features of the present invention will become apparent from the following detailed description and the appended claims with reference to the accompanying drawings.

BRIEF DESCRIPTION OF THE DRAWINGS

FIG. 1B is a diagram showing a conventional back projecting type display apparatus corresponding to FIG. 1A;

FIG. 1C is a diagram showing a conventional back projecting type display apparatus of the oblique incident type;

FIGS. 3A and 3B are diagrams for explaining optical paths of incident light fluxes in conventional Fresnel lens surfaces;

FIG. 5A is a partial enlarged diagram of a screen in the embodiment of FIG. 4A; and FIGS. 5B to 5F are diagrams showing other embodiments.

DETAILED DESCRIPTION OF THE PREFERRED EMBODIMENTS

Figure 1A:
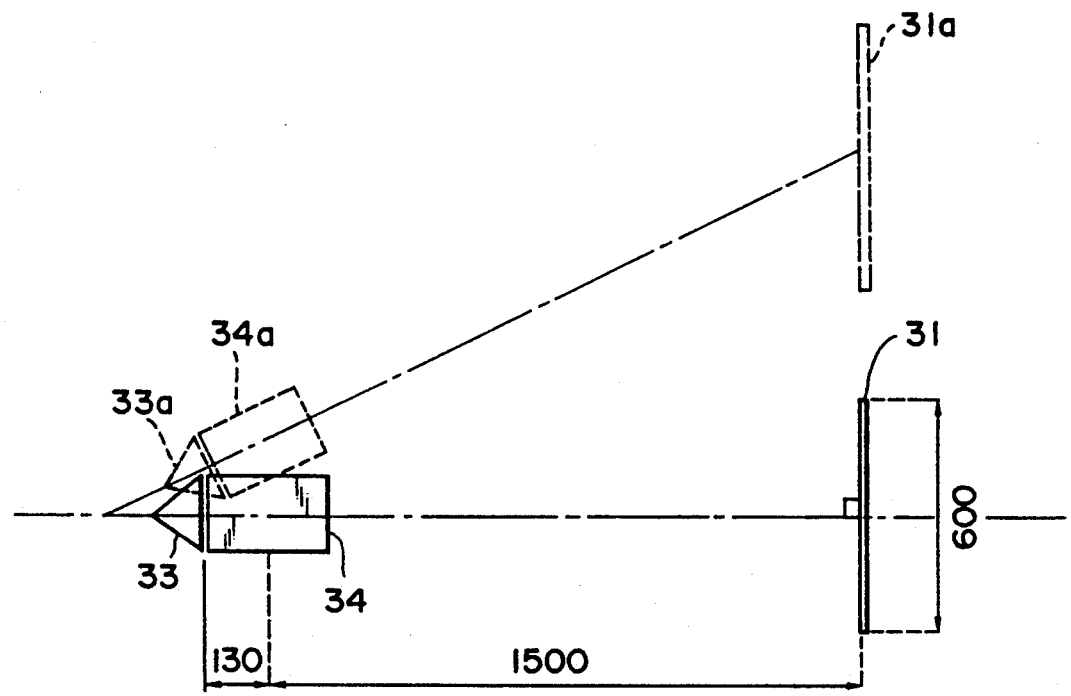
FIG. 1A is a schematic diagram of a conventional projecting system.
Figure 1D:
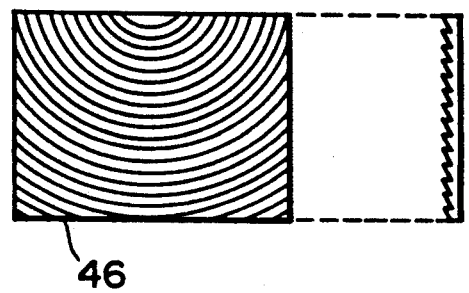
FIGS. 1D and 1E are diagrams showing conventional eccentric Fresnel lenses.
Figure 1E:
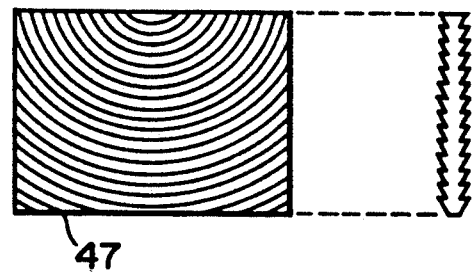
Figure 2A:
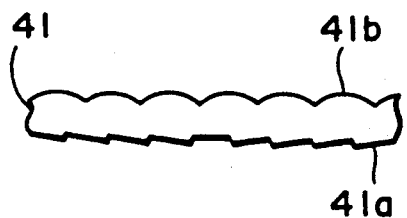
FIGS. 2A and 2B are diagrams showing conventional back projecting type screens.
Figure 2B:
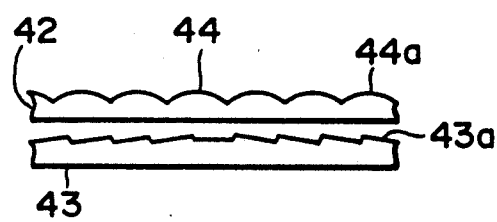
Figure 3A:
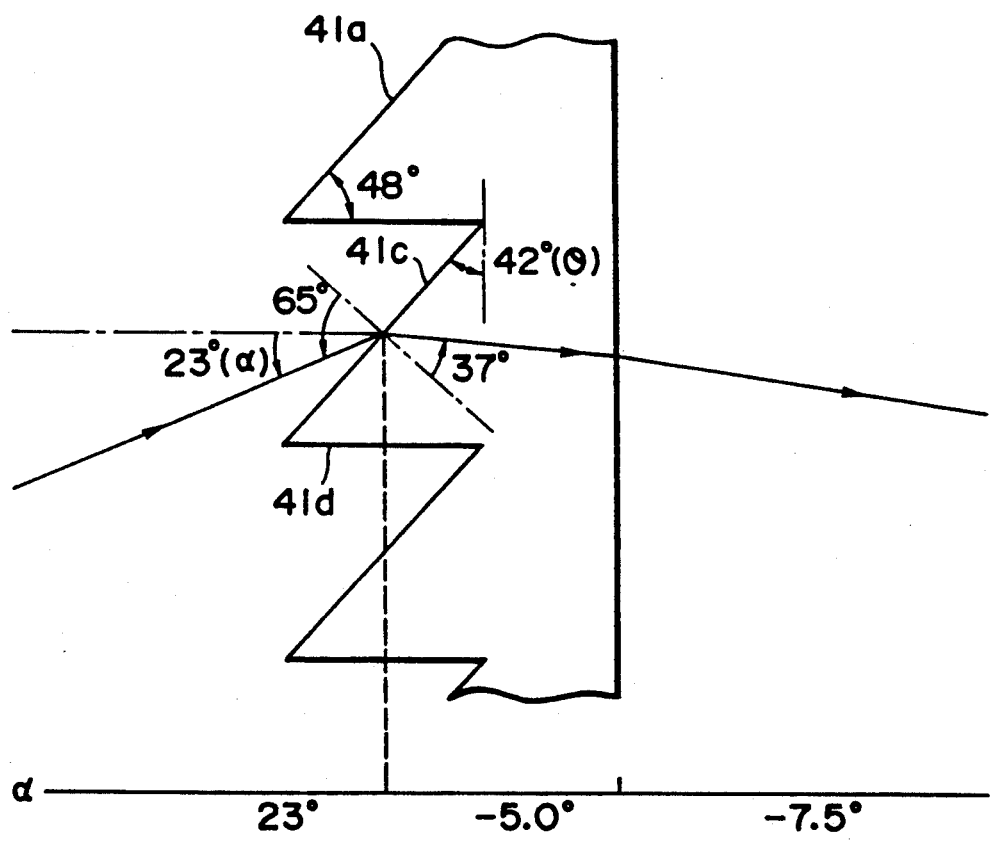

To accomplish the above objects, a display apparatus of an embodiment of the invention, which will be explained hereinbelow, is constructed in a manner such that a plurality of sheets are arranged so as to face one another, a number of prisms which extend like a straight line or a curve on the observing side of each sheet are formed on at least two sheets among those sheets, and non-effective portions of the number of prisms of the sheets excluding at most one of the above at least two sheets which is closest to the back side are set to surfaces which are arranged substantially along the progressing direction of a principal ray of the light flux to the prisms. The "principal ray" which is used in the specification denotes a light beam which passes through the center of the pupil of a projection lens.

The "surfaces which are arranged substantially along" means that the surfaces are arranged along the lines within an angle range which is defined by two directions of the progressing direction of the principal ray of the light flux after it was refracted by the surface (incident surface) on the back side of the corresponding sheet and the progressing direction of the principal ray of the light flux after it was further refracted by the surface (emitting surface) on the observing side.

On the other hand, in the projector, since the projection lens has a limited pupil diameter as mentioned above, the incident angle of the light flux has an extent even with respect to one point on the sheet. In consideration of the above point, as more preferable conditions to accomplish the above objects, it is possible to construct such that the non-effective portions are arranged along an almost intermediate value of the angle range which is defined by two directions of the progressing direction of the principal ray of the light flux after it was further refracted by the surface (incident surface) on the back side of the corresponding sheet and the progressing direction of the principal ray of the light flux after it was refracted by the surface (emitting surface) on the observing side. Further, in an apparatus having a plurality of projection lenses, it is sufficient that the surfaces of the non-effective portions are arranged along the average progressing direction of the principal rays of the light fluxes emitted from the lenses in consideration of the progressing direction of the principal ray of each pupil.

In the display apparatus with the above construction, since the power is distributed by a plurality of prism forming surfaces, even for the light flux whose incident angle to the screen surface is large, the incident angle can be suppressed to a relatively small value at each prism forming surface and a reflection loss at each surface decreases.

Further, the non-effective portions of the prism forming surfaces excluding at most one sheet on the side closest to the projecting means are set to the surfaces which are arranged substantially along the progressing direction of the light flux to each portion of the prism forming surfaces. Therefore, an unpreferable influence of a repetitive periodic structure of the prism group is caused by only the above at most one sheet due to the eclipse at the non-effective surfaces. A moire phenomenon or the like hardly occurs among a plurality of repetitive periodic structures.

Figure 4A:
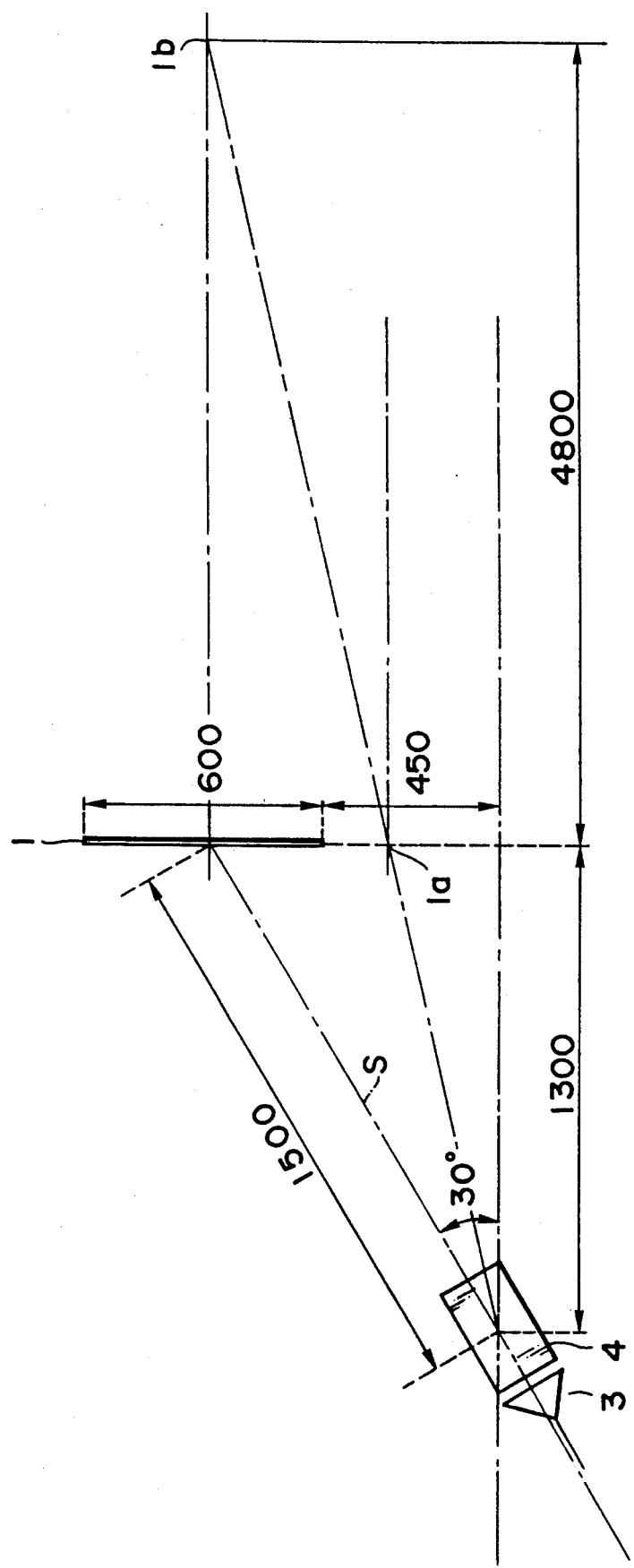
FIG. 4A is a schematic diagram of the main section when an embodiment of the invention is applied to a projecting system of the oblique incident type.

FIG. 4A shows a schematic structure of the main section when the first embodiment of the display apparatus of the invention is applied to a projecting system of the oblique incident type. In the diagram, reference numeral 1 denotes a screen, 3 indicates a CRT by which an image to be projected is formed, and 4 represents a projection lens whose optical axis S is inclined by only 30° from the horizontal direction. The CRT 3 and projection lens 4 are elements of projecting means. In the diagram, numerical values such as 600 and the like denote dimensions and distances (a unit is mm).

Figure 4B:
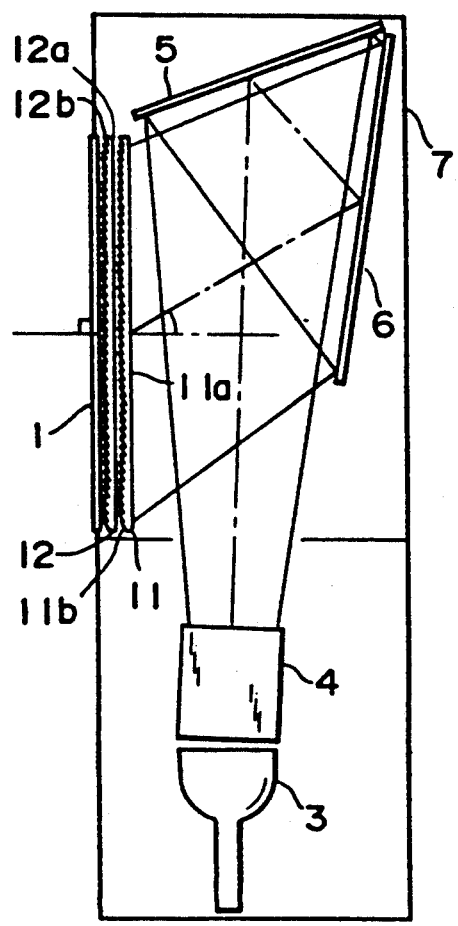
FIG. 4B is a schematic diagram of a whole construction of the system of FIG. 4A.

FIG. 4B shows an embodiment of a back projecting type display apparatus in which the system of FIG. 4A is enclosed in a cabinet. Reference numerals 5 and 6 denote mirrors and 7 indicates a cabinet.

FIG. 5A is an enlarged diagram of a part of the screen 1 in each of FIGS. 4A and 4B and shows a principal ray of the incident light flux in the screen peripheral portion (particularly, the upper portion in FIG. 4A and the lower portion in FIG. 4B). A progressing angle $\alpha$ of the principal ray of the incident light flux at each surface to the horizontal direction is shown in the lower portion in FIG. 5A. In the embodiment, the screen 1 comprises two translucent sheets (also referred to as Fresnel lenses) 11 and 12 each having a Fresnel lens surface formed with a number of prisms. The screen 1 is made of a material such as a methacryl resin having a refractive index of about 1.5 or the like. The sheet 11 arranged on the back side, that is, the light flux incident side is constructed as a first Fresnel lens surface in which a first surface 11a on the incident side is a plane surface and the lower portion in FIG. 4B of a second surface 11b on the observing side, i.e., the emitting side, is formed with a number of prisms of the shapes each having inclination angles $\theta_{11}$ and $\theta_{12}$ shown in the diagram. An effective portion 11c of the first Fresnel lens surface has a concentric circular shape which has a focal distance of $f_1$ and whose center is located at a point 1a in FIG. 4A. In the case of FIG. 4B, the center of the concentric circular shape is located in the upper portion of the screen 1.

The sheet 12 on the observing side is constructed as a second Fresnel lens surface in which a first surface 12a on the incident side is a plane surface and a second surface 12b on the observing side is formed with prisms having the shapes (inclination angles $\theta_{21}$ and $\theta_{22}$) different from those of the first Fresnel lens surface 11b. An effective portion 12c of the second Fresnel lens surface has a concentric circular shape which has a focal distance $f_2$ and whose center is located at the point 1a in FIG. 4A.

The light flux from the projection image is refracted by the screen 1 with the above construction and progresses so as to be focused to a point 1b in FIG. 4A on the observing side (to a position which is away from the screen 1 by only the distance which is about eight times longer than the height of the screen 1). At this time, as shown in FIG. 5A, an incident angle of the light flux which enters the outermost peripheral portion (lower portion in FIG. 4B) of the screen 1 to the first surface 11a of the sheet 11 is set to 45° and a transmission factor is set to about 95%. An incident angle to the effective surface 11c of the second surface 11b is set to 27° and a transmission factor is set to about 95%. Further, an incident angle to the first surface 12a of the sheet 12 is set to 12° and a transmission factor is set to about 96%. An incident angle to the effective surface 11c of the second surface 12b is set to 26.5° and a transmission factor is set to about 95%. In this manner, the light flux is emitted from the second surface 12b of the sheet 12 at a progressing angle of $-7.5°$. Therefore, in the embodiment, a transmission factor T2 in the outermost peripheral portion of the screen 1 is set to $$T_2 = 0.95 \times 0.95 \times 0.96 \times 0.95 \times 100$$
$$= 82\, (\%)$$

Therefore, for the transmission factor of 85% in the central portion of the screen 1, the transmission ratio is $82/85 = 0.97$ and this means that a light amount in the peripheral portion (the lower portion in FIG. 4B) of the screen hardly decreases.

Further, in the embodiment, the inclination of a non-effective surface 11d of the first Fresnel lens portion 11b of the sheet 11 and the inclination of a non-effective surface 12d of the second Fresnel lens portion 12b of the sheet 12 are constructed substantially along the progressing direction of the principal ray from the projection lens of the light flux which enters each portion. That is, in the portion shown in FIG. 5A of the embodiment, when considering only the principal ray from the projection lens, the condition (allowable angle range of the non-effective portion) in which no eclipse occurs in the non-effective surface 11d is such that $\theta_{12}$ lies within a range from 62° $(90-28=62$ since the non-effective surface 11d is parallel with the incident light beam to the effective surface 11c) or more to 78° $(43+(90-55 (\theta_{11}))=78$ since the non-effective surface 11d is parallel with the emission light beam from the effective surface 11c) or less. The condition in which no eclipse occurs in the non-effective surface 12d is such that $\theta_{22}$ lies within a range from 82° $(90-8=82$ since the non-effective surface 12d is parallel with the incident light beam to the effective surface 12c) or more to 97.5° (42+(90−34.5 ($\theta_{21}$))=97.5 since the non-effective surface 12d is parallel with the emission light beam from the effective surface 12c) or less. Therefore, $\theta_{12}$=70° and $\theta_{22}$=90° in FIG. 5A satisfy the above conditions.

Figure 4C:
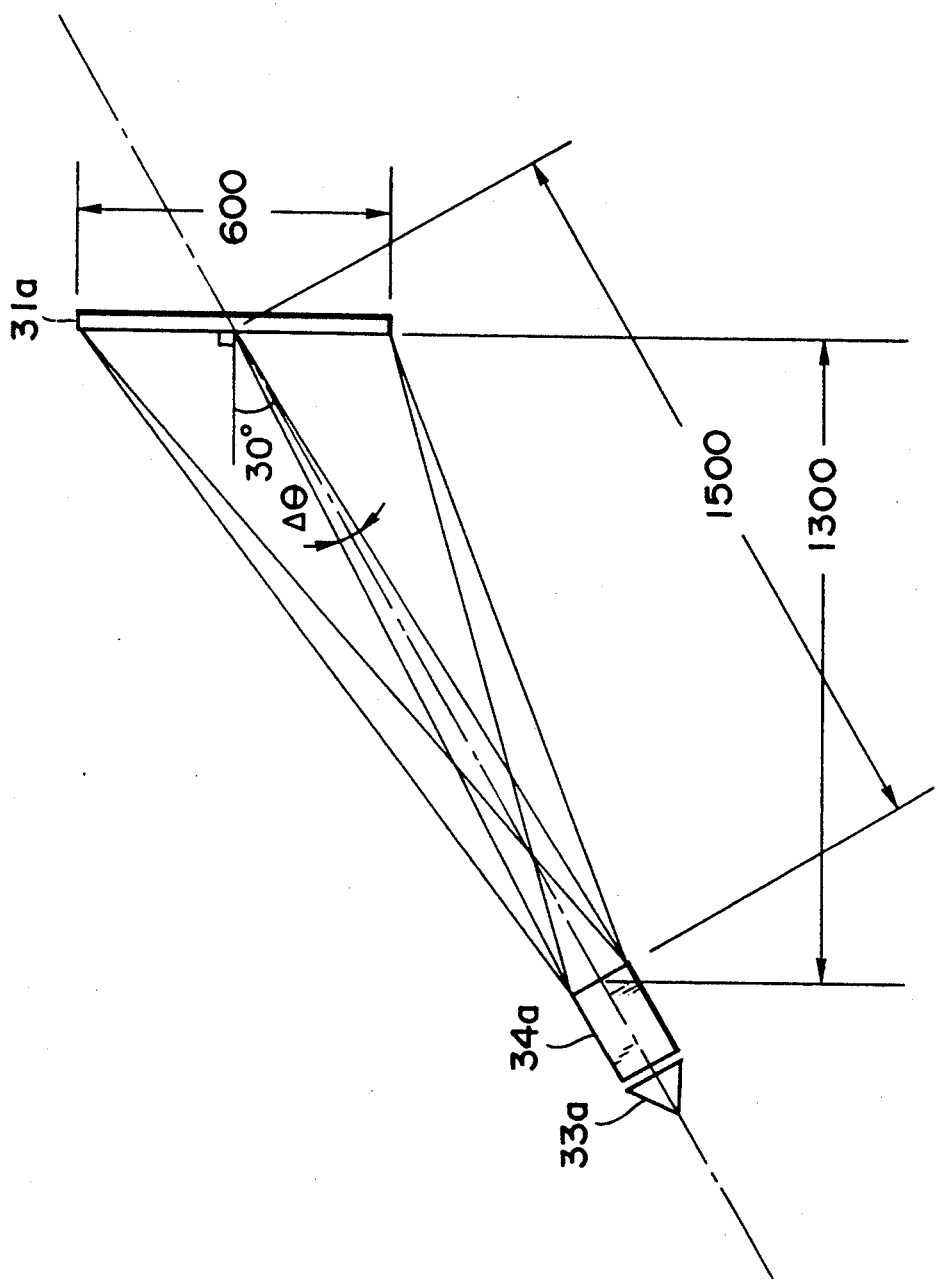
FIG. 4C is an explanatory diagram of a projection lens in the system of FIG. 4A.

Although the explanation has been made above with respect to the case where the light flux progresses from only one direction to a certain point on the screen, in the actual projector, as shown in FIG. 1A the projection lens 34 (34a) of the projector has a limited pupil diameter. Therefore, the incident angle of the light flux which enters a certain point on the screen has a limited extent around the principal ray as a center. In order to cope with such a limited extent, the allowable range to the direction of the non-effective portion of the Fresnel lens is used. FIG. 4C shows an optical arrangement of an oblique incident projecting system of 30° in which the principal ray from the projection lens enters the center of the screen at an angle of 30°. The image from the CRT 33a is projected onto the screen 31a through the projection lens 34a. Now, assuming that a distance between the center of the screen and the front edge of the lens is set to 1500 mm, a focal distance of the projection lens is set to 130 mm, and an F number of the lens in case of imaging at infinite distance is set to 1.0, the effective pupil diameter of the projecting system is set to about 120 mm. At this time, an angle $\Delta\theta$ from the center of the screen to the pupil diameter of the lens is set to about 5°. In the lower edge portion of the screen 31a, the angle $\Delta\theta$ is also set to about 5° when considering that as compared with the central portion of the screen, the distance between the screen and the lens is smaller and the apparent lens pupil diameter is smaller. On the other hand, in the upper edge portion of the screen 31a, the angle is set to 5° or less since as compared with the central portion of the screen, the distance between the center of the screen and the front edge of the lens is larger and the apparent lens pupil diameter is smaller.

If the angle of the non-effective portion is set to an almost intermediate value of the allowable angle range of the non-effective portion to the principal ray among the incident light fluxes having such a limited extent angle, when the extent angle of the projection lens is smaller than the allowable angle range of the non-effective portion, the angle of the non-effective portion lies within the allowable range with respect to all of the possible incident angles of the light fluxes which enter a certain point on the screen from the projection lens. Therefore, theoretically, none of the lights from the projection lens enters the non-effective portion and no light flux eclipse occurs. Even in the case where the extent angle of the projection lens is larger than the allowable angle range of the non-effective portion to a certain degree, by setting the angle of the non-effective portion to a substantially middle angle of the allowable angle range of the non-effective portion, the angle of the non-effective portion falls within the allowable angle range for the incident angle of the portion near the central portion having a large light intensity among the incident angles of the light fluxes which enter a certain point on the screen from the projection lens. Thus, most of the light from the projection lens does not enter the non-effective portion and an eclipse is reduced and the light can be effectively transmitted. As mentioned above, an amount of incident light fluxes which enter the non-effective portion of the Fresnel lens can be suppressed to zero or can be minimized. When the extent angle is smaller than the above allowable angle range, the direction of the non-effective portion can be freely set in a range such as not to cause the light flux eclipse.

In the embodiment, the above construction is accomplished by setting $\theta_{12}$ to 70° for the allowable angle range (from 62° or more to 78° or less) of the non-effective portion of the Fresnel lens 11 and by setting $\theta_{22}$ to 90° for the allowable angle range (from 82° or more to 97.5° or less) of the noneffective portion of the Fresnel lens 12.

Therefore, the light flux eclipse hardly occurs in the non-effective portions 11d and 12d of both sheets 11 and 12 and a moire phenomenon between the periodic structures of both sheets also hardly occurs.

The allowable angle range to the direction of the non-effective portion of the Fresnel lens shown in the embodiment depends on the difference (deflection angle) between the incident angle and the emission angle of the light beam at the effective surface of the Fresnel lens. Therefore, even on the screen, as a deflection angle at a certain position is larger, the allowable range of the non-effective portion is extended. This means that the invention is particularly effective to an oblique incident optical system in which the incident angle of the light flux to the screen and the deflection angle become larger.

Figure 4D:
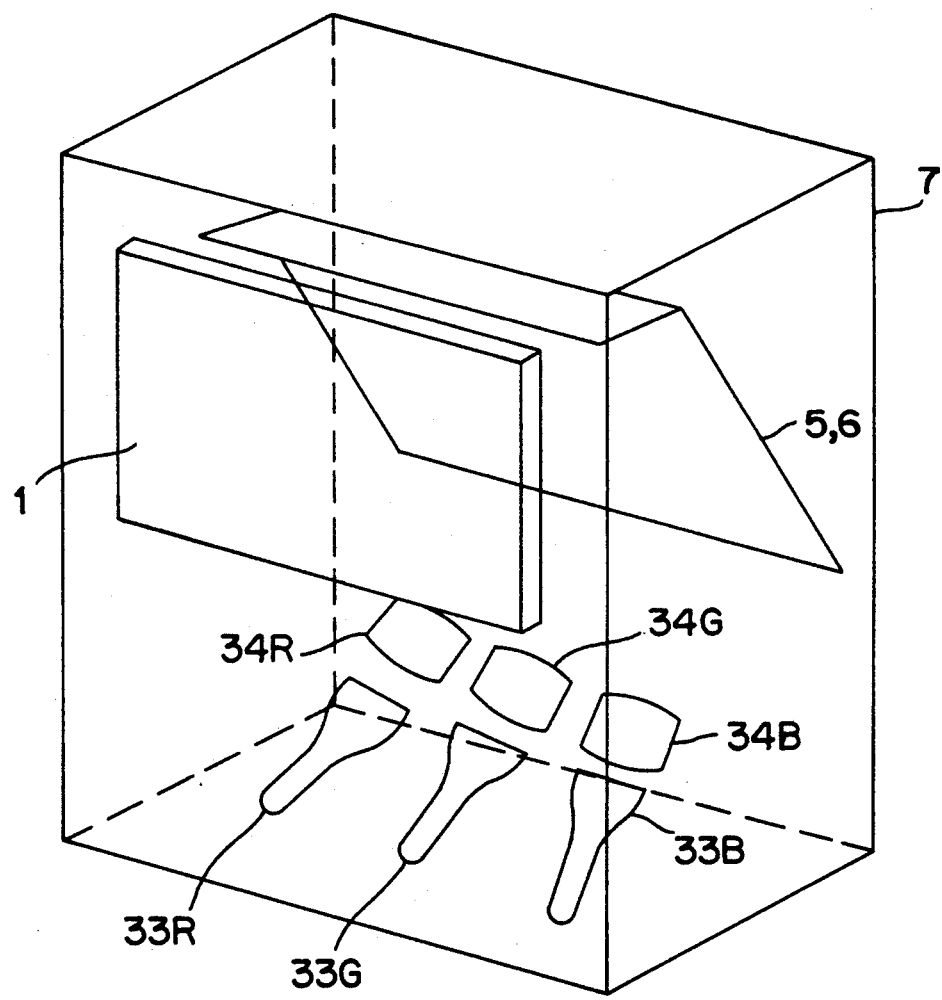
FIG. 4D is a schematic diagram of a modified projecting system.

As a modification of the embodiment, in the case where one CRT 33 is provided for every color of R, G, and B and one projection lens is also provided every CRT, that is, in the case where a plurality of projection lenses are provided, each lens has a limited pupil diameter. Such a modification is shown in FIG. 4D, wherein a CRT 33 and projection lens 34 is provided for each color red (R), green (G) and blue (B). Therefore, in consideration of the progressing direction of the main light beam of each pupil, it is sufficient to set the surface of the non-effective portion to the substantially middle angle of the allowable angle range of the non-effective portion to the light beam whose incident angle is set to the angle of the average value of the angles in a plurality of progressing directions of the principal rays of the pupils.

FIG. 5B is a partial enlarged diagram of a screen in the second embodiment of the display apparatus of the invention and shows the principal ray of the incident light flux in the peripheral portion of the screen. The embodiment shown in FIG. 5B comprises two translucent sheets 11' and 12' each having a Fresnel lens surface in a manner similar to the embodiment shown in FIG. 5A. However, in the second embodiment, only the inclination of a non-effective surface 12d' of a second Fresnel lens portion 12b' of the sheet 12' is constructed so as to be arranged substantially along the progressing direction of the principal ray of the light flux which enters each portion.

In this case, among light fluxes a ($a_1 + a_2$) corresponding to a unit period of the periodic structure of the first Fresnel lens, a light flux $a_2$ which enters the non-effective portion 11b' progresses in the extraordinary direction. Therefore, a remaining normal light flux $a_1$ which is obtained by subtracting the light flux $a_2$ from the light fluxes a is emitted from the first Fresnel lens 11'. The normal light flux $a_1$ has a periodic structure of a period which is equal to that of a concave/convex structure of the first Fresnel lens and a light amount decreases by the amount of the extraordinary light when it is seen from the side of the second Fresnel lens 12'. In FIG. 5B, α denotes a progressing angle of the light flux $a_1$ to the horizontal direction of the principal ray. In the second Fresnel lens 12', the angle of the non-effective portion is set to an almost intermediate value (90°) of the allowable angle range (from 82° or more to 97.5° or less) of the non-effective portion to the principal ray of the normal light flux $a_1$ from the first Fresnel lens. Therefore, as will be obvious from the above description, the eclipse of the light flux from the projection lens having the limited pupil diameter by the noneffective portion of the second Fresnel lens 12' can be suppressed to zero or can be minimized.

According to the first Fresnel lens 11', a fine light-/dark alternate fringe (periodic structure) corresponding to the concave/convex structure of the lens is applied to the incident light flux whose cross sectional light intensity is almost uniform and the light flux is emitted to the emitting side. In this case, an intensity amplitude of the periodic structure accompanied with an energy loss is generated. In the second Fresnel lens 12', if the incident light causes an eclipse by the non-effective portion, an eclipse light amount in the second Fresnel lens changes depending on an overlap state of the light portion of the fringe of the light fluxes from the first Fresnel lens and the non-effective portion. Therefore, large light and dark portions, that is, a moire occurs on the screen due to the relation of the concave/convex structures of the first and second Fresnel lenses (i.e., a variation in period due to the period (pitch) difference, manufacturing errors in the case of the same period, or the like).

On the other hand, in the embodiment, since the eclipse by the non-effective portion of the Fresnel lens 12' is set to zero or is minimized as mentioned above, no moire occurs or a moire hardly occurs.

As will be understood from the above description, the condition in which no moire occurs is such that an operating member (in this case, the first Fresnel lens) which first applies a periodicity to a member (in this case, the light flux) to be operated is excluded, and with respect to the operating member (in this case, the second Fresnel lens) after such a first operating member, an extraordinary operating portion (in this case, the light flux eclipse by the non-effective portion of the second Fresnel lens) never or hardly exists.

In the embodiment as well, in a manner similar to the above, in the case of having a plurality of projection lenses, it is sufficient to set the surface of the non-effective portion to a substantially middle angle of the allowable angle range of the non-effective portion for the light beam whose incident angle is set to the average value of the angles in the progressing directions of the principal rays from the lenses.

Figure 5C:
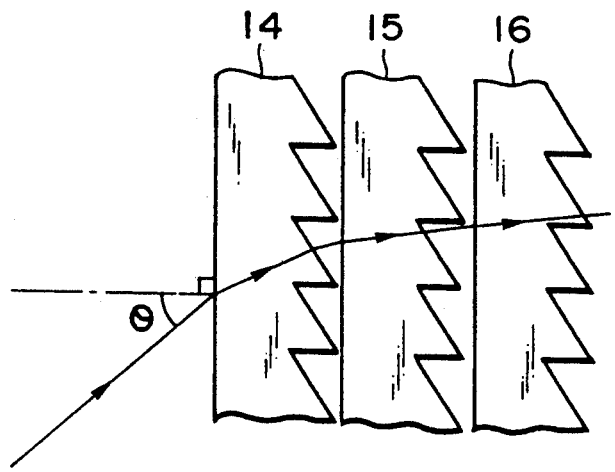

FIG. 5C shows an embodiment in which three Fresnel lenses are provided.

In FIG. 5C, Fresnel lens surfaces are formed on the emitting sides of three translucent sheets 14, 15, and 16 and the power can be more effectively distributed and the projecting system can cope with the oblique incidence of a larger incident angle. In the embodiment as well, the non-effective surface of the Fresnel lens surface is arranged so as to be substantially parallel with the intermediate direction of the progressing direction of the principal ray of the incident light flux in the lens and the progressing direction of the main light beam after it was emitted from the lens with respect to the second and subsequent sheets excluding at most the first sheet 14 from the projecting means side.

The above condition relates to only the shape of the prisms of the Fresnel lens surface and is not concerned with the pitch ratio of the prisms or the like. On the other hand, the moire suppressing method is extremely effective as compared with the method of widening the interval between the Fresnel lens surfaces or the like and the interval between the Fresnel lens surfaces can be reduced. Therefore, such a moire suppressing method is also excellent with respect to the suppression of a deterioration in resolution, the realization of a light weight due to a decrease in thickness of the screen, the simplification of the holding mechanism of the screen, and the like.

Figure 5D:
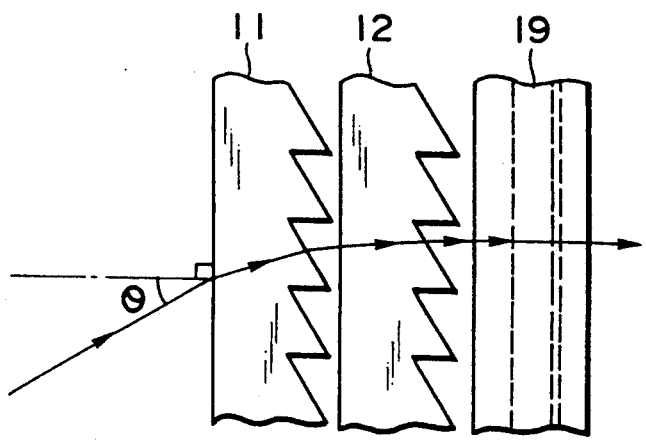

FIG. 5D shows another embodiment in which both surfaces of a sheet 19 arranged at the nearest position on the observing side of the screen are set to lenticular lens surfaces each having the light diffusing function and the remaining sheets 11 and 12 are constructed in the same manner as the Fresnel lens in the first embodiment. FIG. 5E shows a plan view of the embodiment of FIG. 5D when it is seen from the upper direction of FIG. 4B. The double lenticular sheet 19 has black stripes 19a, so that right and left angles of visibility are extended, the color shift due to the construction in which three CRTs for a color image are arranged, the incidence and reflection of the outside light on the CRT screen, and the like are prevented, and a more preferable image and visual field characteristics are obtained. The other points are the same as those in the embodiment of FIG. 5A.

Figure 5F:
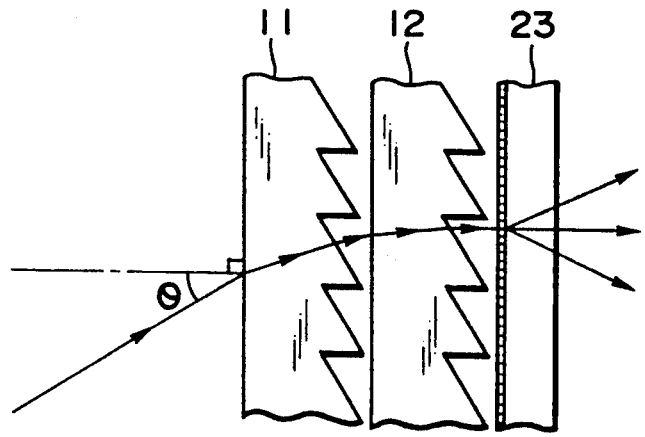
Figure 5E:
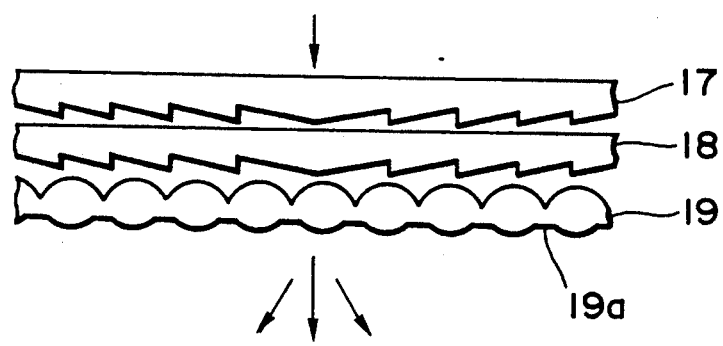

In a further another embodiment of FIG. 5F, the sheets 11 and 12 are similar to those in the first embodiment and a light diffusing surface having the functions such as control of the angle of visibility and the like is formed on the incident side of a sheet 23. The other points are the same as those in the embodiment of FIG. 5E.

The above embodiments have been shown and described with respect to examples in which a plurality of sheets formed with the concentric eccentric circular Fresnel lens surfaces. However, it is also possible to use a combination of a linear Fresnel lens and a powerless Fresnel lens or the like and it is not always necessary to construct the eccentric Fresnel lens surface.

On the other hand, although it is preferable to set the surface on the incident side of each sheet to a plane surface as in the above embodiments, the invention is not limited to such a plane surface structure.

Since the invention has the above construction, it is possible to provide a back projecting type screen of the oblique incident type and a back projecting type display apparatus using such a screen in which even if the power is distributed by using a plurality of Fresnel lens sheets, a moire phenomenon or the like among the repetitive periodic structures of the prism groups on the sheets can be suppressed as small as possible and a projection image which is light and good for the whole surface of the screen can be observed. On the other hand, if the Fresnel lens surface on at least one sheet is formed such that the center of a number of concentric circular prisms is eccentric from the center of the screen, the projection image becomes further light with respect to the whole surface.

What is claimed is:

1. A display apparatus comprising:
    projecting means for projecting an image, said projecting means having a projection optical system having a limited pupil diameter; and screen means arranged at a position where an image is substantially projected by said projecting means, said screen means having a plurality of Fresnel lens sheets each having a number of prisms formed on a surface on a side opposite to said projecting means, and each of said prisms having an effective portion for allowing a light flux from said projecting means to be emitted in a predetermined direction and a non-effective portion which does not contribute to the emission of the light flux in said predetermined direction, and wherein the non-effective portions of at least one selected sheet from said plurality of Fresnel lens sheets, excluding said sheet arranged at a position nearest to said projecting means, extend in a middle direction substantially between a direction in which a principal ray of a light flux from said projecting means is incident on the effective portions of said prisms of said selected sheet and a direction in which the principal ray is emitted from the effective portions of said prisms of said selected sheet.

2. An apparatus according to claim 1, wherein said screen means has a sheet having a light diffusing function disposed on a side farthest from said projecting means.

3. A display apparatus comprising:
a plurality of projecting means for projecting images, each of said projecting means having a projection optical system having a limited pupil diameter; and
screen means arranged at a position where an image is substantially projected by said projecting means, said screen means having a plurality of Fresnel lens sheets each having a number of prisms formed on a surface on a side opposite to said projecting means, each of said prisms having an effective portion to emit a light flux from said projecting means in a predetermined direction and a non-effective portion which does not contribute to the emission of the light flux to said predetermined direction, wherein the non-effective portions of at least one of said plurality of Fresnel lens sheets, excluding said sheet arranged at a position nearest to said projecting means, is formed so as to have a substantially middle angle between the average value of the angles of principal rays when light fluxes from said plurality of projecting means progress in said sheets and the average value of emission angles of the principal rays when they are emitted from the effective portions of said prisms of said sheets.

4. An apparatus according to claim 3, wherein said screen means has a sheet having a light diffusing function disposed on a farthest side from said projecting means.

5. An apparatus for displaying a picture, comprising:
projecting optical means for projecting an image; and
a screen on which the image is projected, said screen including a first translucent sheet and a second translucent sheet, and wherein a beam for producing the image is transmitted to said second translucent sheet through said first translucent sheet, with said first translucent sheet having a first surface receiving the beam and a second surface on which a first Fresnel lens comprising a plurality of prism-shaped structures is formed, said second translucent sheet having a third surface facing said second surface and a fourth surface receiving the beam through said third surface, and wherein a second Fresnel lens comprising a plurality of prism-shaped structures is formed on said fourth surface, each of said prism-shaped structures of said second Fresnel lens having a refractive surface refracting the beam and another surface, and wherein an angle of said another surface with respect to an axis normal to said second translucent sheet is set so as to have a substantially middle value between an angle of a principal ray with respect to said axis when said beam is incident on said refractive surface and an angle of said principal ray with respect to said axis when said beam is emitted from said refractive surface.

6. An apparatus according to claim 5, wherein said projecting optical means has an optical axis which is inclined to an axis normal to said first surface of said first translucent sheet.

7. An apparatus according to claim 5, wherein said first surface of said first translucent sheet and said third surface of said second translucent sheet are flat surfaces.

8. An apparatus according to claim 5, wherein said screen includes a third translucent sheet on the side of said fourth surface of said second translucent sheet, said third translucent sheet having a fifth surface facing said fourth surface and a sixth surface receiving the beam through said fifth surface, and wherein said third translucent sheet has a lenticular lens on said fifth surface.

9. An apparatus according to claim 8, wherein said sixth surface of said third translucent sheet has a lenticular lens.

10. An apparatus according to claim 5, wherein said screen includes a third translucent sheet on the side of said fourth surface of said second translucent sheet, said third translucent sheet having a fifth surface facing said fourth surface and a sixth surface on the side opposed to said second translucent sheet, and wherein said third translucent sheet has a lenticular lens on said sixth surface.

11. An apparatus according to claim 5, wherein said screen includes a third translucent sheet on the side of said fourth surface of said second translucent sheet, said third translucent sheet having a fifth surface facing said fourth surface of said second translucent sheet and a sixth surface on the side opposed to said second translucent sheet, and wherein said third translucent sheet has a Fresnel lens formed on said sixth surface.

12. A display apparatus, comprising:
projecting optical means for projecting an image; and
a screen on which the image is projected, said screen including a first translucent sheet and a second translucent sheet, with said first translucent sheet having a first surface and a second surface, with a first Fresnel lens comprising a plurality of prism-shaped structures formed on said second surface, said second translucent sheet having a third surface and a fourth surface, with a second Fresnel lens comprising a plurality of prism-shaped structures formed on said fourth surface, each of said prism-shaped structures of at least one of said first and second Fresnel lenses having a refractive surface refracting a beam indicative of the image and another surface, and wherein an angle of said another surface with respect to an axis normal to said translucent sheets is set so as to have a substantially middle value between an angle of a principal ray with respect to the normal axis when the beam is incident on said refractive surface and an angle of said principal ray with respect to the normal axis when the beam is emitted from said refractive surface.

13. A screen on which an image is projected, comprising:
    a first translucent sheet; and
    a second translucent sheet;
    wherein said first translucent sheet has a first surface and a second surface, with a first Fresnel lens comprising a plurality of prism-shaped structures formed on said second surface, and said second translucent sheet has a third surface and a fourth surface, with a second Fresnel lens comprising a plurality of prism-shaped structures formed on said fourth surface, and each of said prism-shaped structures of at least one of said first and second Fresnel lenses has a refractive surface refracting a beam indicative of the image and another surface, and an angle of said another surface with respect to an axis normal to said translucent sheets is set so as to have a substantially middle value between an angle of a principal ray with respect to the normal axis when the beam is incident on said refractive surface and an angle of said principal ray with respect to the normal axis when the beam is emitted from said refractive surface.

14. A screen on which an image is projected, comprising:
    a first translucent sheet; and
    a second translucent sheet;
    wherein a beam indicative of the image is transmitted to said second translucent sheet through said first translucent sheet, with said first translucent sheet having a first surface receiving the beam and a second surface on which a first Fresnel lens comprising a plurality of prism-shaped structures is formed, and said second translucent sheet having a third surface facing said second surface and a fourth surface receiving the beam through said third surface and having a second Fresnel lens comprising a plurality of prism-shaped structures formed thereon, and each of said prism-shaped structures of said second Fresnel lens has a refractive surface refracting the beam and another surface, and an angle of said another surface with respect to an axis normal to said translucent sheets is set so as to have a substantially middle value between an angle of a principal ray with respect to the normal axis when the beam is incident on said refractive surface and an angle of said principal ray with respect to said axis when said beam is emitted from said refractive surface.

* * * * *

UNITED STATES PATENT AND TRADEMARK OFFICE
CERTIFICATE OF CORRECTION

PATENT NO. : 5,208,620
DATED : May 4, 1993
INVENTOR(S) : Hideaki Mitsutake, et al.

It is certified that error appears in the above-indentified patent and that said Letters Patent is hereby corrected as shown below:

COLUMN 4:

Line 31, "partial" should read --partially--.

COLUMN 5:

Line 1, "almost intermediate" should read --substantially middle--.

Signed and Sealed this

Third Day of May, 1994

Attest:

BRUCE LEHMAN

*Attesting Officer*    *Commissioner of Patents and Trademarks*